United States Patent
Piasse et al.

(10) Patent No.: US 8,015,717 B2
(45) Date of Patent: Sep. 13, 2011

(54) VARIABLE SHAFT SIZING FOR MEASUREMENT TARGETS

(75) Inventors: Michael L. Piasse, St. Charles, MO (US); Jonathan B. Wilson, Maryland Heights, MO (US); Ike C. Schevers, Festus, MO (US)

(73) Assignee: The Boeing Company, Chicago, IL (US)

( * ) Notice: Subject to any disclaimer, the term of this patent is extended or adjusted under 35 U.S.C. 154(b) by 187 days.

(21) Appl. No.: 12/265,480

(22) Filed: Nov. 5, 2008

(65) Prior Publication Data

US 2010/0114521 A1    May 6, 2010

(51) Int. Cl.
*G01C 15/02* (2006.01)
*G01C 15/06* (2006.01)

(52) U.S. Cl. .................................... 33/293; 33/DIG. 15
(58) Field of Classification Search ............... 33/293, 33/DIG. 15
See application file for complete search history.

(56) References Cited

U.S. PATENT DOCUMENTS

| | | | | |
|---|---|---|---|---|
| 2,959,088 A * | 11/1960 | Rantsch | ..... | 33/290 |
| 3,588,249 A * | 6/1971 | Studebaker | ..... | 3/290 |
| 4,053,238 A * | 10/1977 | George et al. | ..... | 33/DIG. 21 |
| 4,177,964 A * | 12/1979 | Hujsak et al. | ..... | 33/286 |
| 4,527,339 A * | 7/1985 | Brunson | ..... | 33/293 |
| 4,926,563 A * | 5/1990 | Smith | ..... | 33/293 |
| 4,964,218 A * | 10/1990 | Morghen | ..... | 33/293 |
| 4,993,160 A * | 2/1991 | Fraley | ..... | 33/286 |
| 5,073,005 A * | 12/1991 | Hubbs | ..... | 33/293 |
| 5,269,770 A * | 12/1993 | Conway et al. | ..... | 604/265 |
| 5,744,705 A * | 4/1998 | Derouen et al. | ..... | 33/603 |
| 6,266,143 B1 * | 7/2001 | Peterson et al. | ..... | 33/293 |
| 6,285,959 B1 | 9/2001 | Greer | | |
| 6,487,517 B2 | 11/2002 | Sakai et al. | | |
| 6,694,861 B2 * | 2/2004 | Glasson | ..... | 33/763 |
| 6,717,683 B1 | 4/2004 | Wakashiro et al. | | |
| 6,729,036 B2 * | 5/2004 | Denzel et al. | ..... | 33/706 |
| 6,813,840 B1 * | 11/2004 | Delmas et al. | ..... | 33/293 |
| 7,268,893 B2 | 9/2007 | Palmateer | | |
| 7,345,653 B2 | 3/2008 | Nolan et al. | | |
| 7,698,826 B2 | 4/2010 | Hubbs | | |
| 2007/0247615 A1 | 10/2007 | Bridges | | |

OTHER PUBLICATIONS

Hubbs Catalog, Hubbs Machine & Manufacturing, Inc., Missouri, 135 pages. http://www.gancell.com/brochures/HubbsCatalog.pdf.
Danehy et al., "Laser-Induced-Fluorescence Photogrammetry and Videogrammetry", Jul. 2004, pp. 1-2, Langley Research Center, Hampton, Virginia.

* cited by examiner

*Primary Examiner* — Yaritza Guadalupe-McCall
(74) *Attorney, Agent, or Firm* — Yee & Associates, P.C.

(57) ABSTRACT

A measurement targeting apparatus comprises a target body, a vessel with a channel, a fluid located within the channel in the vessel, and a pressurization system. The target body is selected from one of a photogrammetry target, a theodolite target, a construction ball, a touch probe target, a coordinating measurement machine probe target, a laser tracker target, and a laser projector target. The vessel has a centerline, has a substantially cylindrical portion capable of being received in a hole in a part, and is comprised of a material selected from steel, aluminum, and plastic. The vessel is capable of expanding when the fluid within the channel in the vessel is pressurized. The pressurization system is capable of pressurizing the fluid within the channel to cause the vessel to expand around the centerline.

18 Claims, 7 Drawing Sheets

VARIABLE SHAFT SIZING FOR MEASUREMENT TARGETS

BACKGROUND INFORMATION

1. Field

The present disclosure relates generally to measurement systems and in particular to a method and apparatus for measuring a part. Still more particularly, the present disclosure relates to a method and apparatus for measuring features on a part.

2. Background

Maintenance, modification, and/or repair of aircraft may be commonly performed. These operations may be performed on commercial, military, and other suitable types of aircraft. During these types of operations, a new part may be created to replace a part that may be worn out and/or obsolete.

Additionally, new parts may be added to existing parts to change the functionality, operation, and/or performance of an aircraft. New parts may be created to mate with existing parts. The features that may be used to mate one part with another part include, for example, without limitation, holes and/or pins.

For example, without limitation, a new part may have a pattern of holes and/or hole diameters that may be required to match those in an existing part. The holes in the existing part may differ from design specifications due to manufacturing tolerances and/or wear occurring from use of the part.

As a result, it may be important to accurately measure mating features such as, for example, without limitation, hole patterns and/or locations and other parameters about holes from the existing part. One technique to identify hole patterns and/or other information about holes may be photogrammetry. Photogrammetry may identify geometric properties about objects using photographic images. For example, without limitation, hole patterns may be identified through the use of photogrammetry.

Measurement targets may be placed into the holes of the part. These measurement targets may include a feature that may allow for an accurate identification of the location of the holes. A measurement target may comprise a feature attached to a shaft. The feature may be, for example, without limitation, an object with a circle having a particular color and/or reflectivity. The shaft may be placed into the hole in the part. The center of the circle may be in line with the centerline of the shaft placed into the hole.

With this type of measurement, it may be important to identify the orientation of the hole, the centerline of the hole, and other information about the hole using these measurement targets.

Difficulties may be encountered in obtaining accurate measurements of a shaft for a measurement target does not correctly fit into a hole. A shaft may not correctly fit into the hole if a shaft is too small or too large. The shaft may be too small in diameter if the measurement target sits within the hole such that the center of the circle is not in line with the centerline of the hole.

Currently, measurement targets with different sized shafts may be used to compensate for different sized holes. Even with different sized shafts, it may not be possible to obtain an exact fit between a shaft and a hole. As a result, errors in measurements may occur that may result in the creation of a new part that may not correctly match an existing part.

Therefore, it would be advantageous to have a method and apparatus that overcomes the issues discussed above, as well as other possible issues.

SUMMARY

In one advantageous embodiment, an apparatus may comprise a target body and an expandable shaft extending from the target body.

In another advantageous embodiment, a measurement targeting apparatus may comprise a target body, a vessel with a channel, a fluid located within the channel in the vessel, and a pressurization system. The target body may be selected from one of a photogrammetry target, a theodolite target, a construction ball, a touch probe target, a coordinate measurement machine probe target, a laser tracker target, and a laser projector target. The vessel has a centerline and has a substantially cylindrical portion capable of being received in a hole in a part. The vessel may be comprised of a material selected from steel, aluminum, and plastic. The vessel may be capable of expanding when the fluid within the channel in the vessel is pressurized. The pressurization system may be capable of pressurizing the fluid within the channel to cause the vessel to expand around the centerline.

In yet another advantageous embodiment, a method may be present for processing a part. The method may include placing a number of measurement targets within a number of holes in the part. The method also may include activating a pressurization mechanism in each measurement target in the number of measurement targets such that an expandable shaft extending from a target body for each measurement target expands in an associated hole in the number of holes in the part to form a number of placed measurement targets. Further, the method may include measuring the number of holes using the number of placed measurement targets.

In still yet another advantageous embodiment, a method may be present for manufacturing a new part. The method may comprise placing a number of measurement targets within a number of holes in a part. A pressurization mechanism in each measurement target in the number of measurement targets may be activated such that an expandable shaft extending from a target body for each measurement target expands in an associated hole in the number of holes in the part to form a number of placed measurement targets. The expandable shaft may have a centerline and expands such that the centerline is substantially aligned with an axis for the associated hole. The target body may be selected from one of a photogrammetry target, a theodolite target, a construction ball, a touch probe target, a coordinating measurement machine probe target, a laser tracker target, and a laser projector target. The method also may comprise measuring the number of holes using the number of placed measurement targets. The method may further comprise manufacturing the new part for use with the part using measurements of the number of holes using the number of placed measurement targets.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
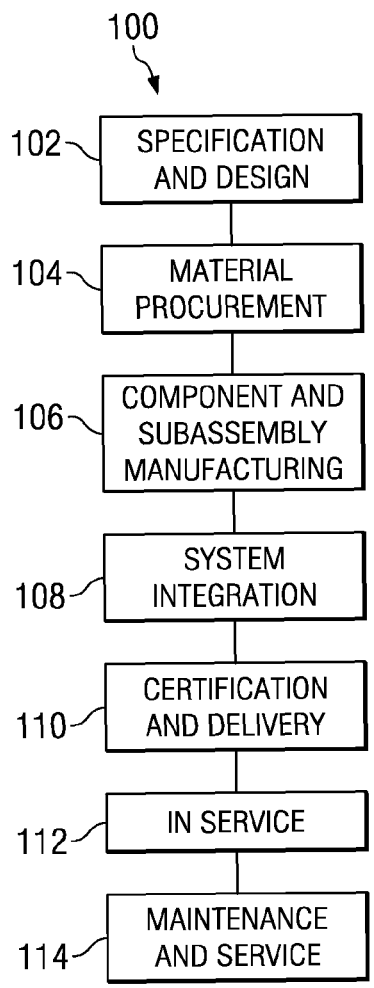
FIG. 1 is a diagram illustrating an aircraft manufacturing and service method in accordance with an advantageous embodiment.
Figure 2:
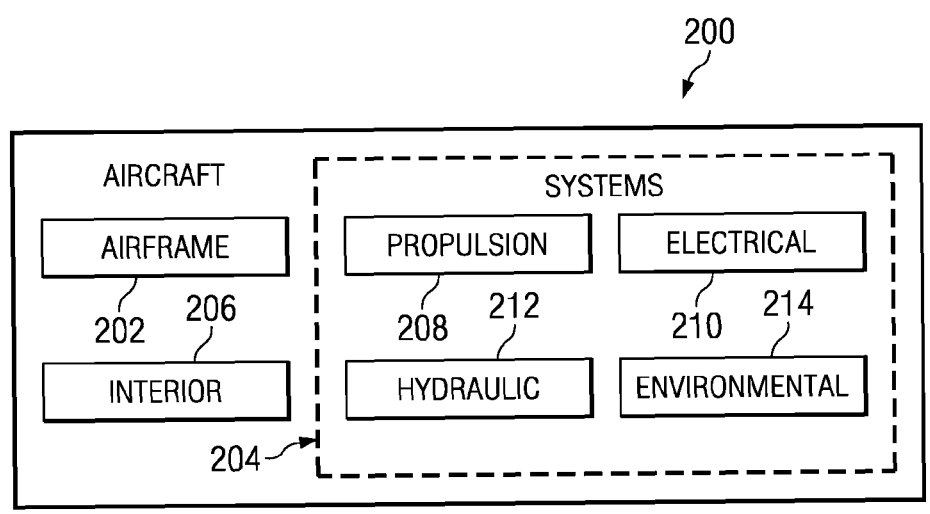
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, without limitation, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1. For example, without limitation, the different advantageous embodiments may be used to measure features in parts during component and subassembly manufacturing 106 and/or during maintenance and service 114 in FIG. 1. These measurements may be used to design and/or modify new parts.

The different advantageous embodiments recognize and take into account that with current measurement targets, shafts in those measurement targets may not accurately fit into holes in a part. In other words, the different advantageous embodiments recognize and take into account that a centerline within a shaft may not align with a centerline for a hole in the part. Without this alignment, measurements of the measurement targets may not be as accurate as desired.

The different advantageous embodiments recognize and take into account that the non-alignment between centerlines may result in an inability to obtain measurements needed to create a new part to mate with the measured part. The mating of holes may also depend upon the type of fastener installed. In some cases, fasteners may have tighter tolerances. The different advantageous embodiments recognize and take into account that accuracy in clearance may be important in making measurements to create new parts.

Thus, the different advantageous embodiments provide an apparatus that may have a target body and an expandable shaft extending from the target body. This expandable shaft may have a vessel with a channel. A fluid may be located within the channel of the vessel in which the vessel may be capable of expanding when the fluid may be placed under pressure. In other words, the shaft in the measurement target may compensate for variations in hole diameters within a part.

These variations in diameter may result from factors such as, for example, without limitation, manufacturing variations. In this manner, the different advantageous embodiments may provide a more accurate identification of a centerline of a hole using the expandable shaft in the measurement target.

Figure 3:
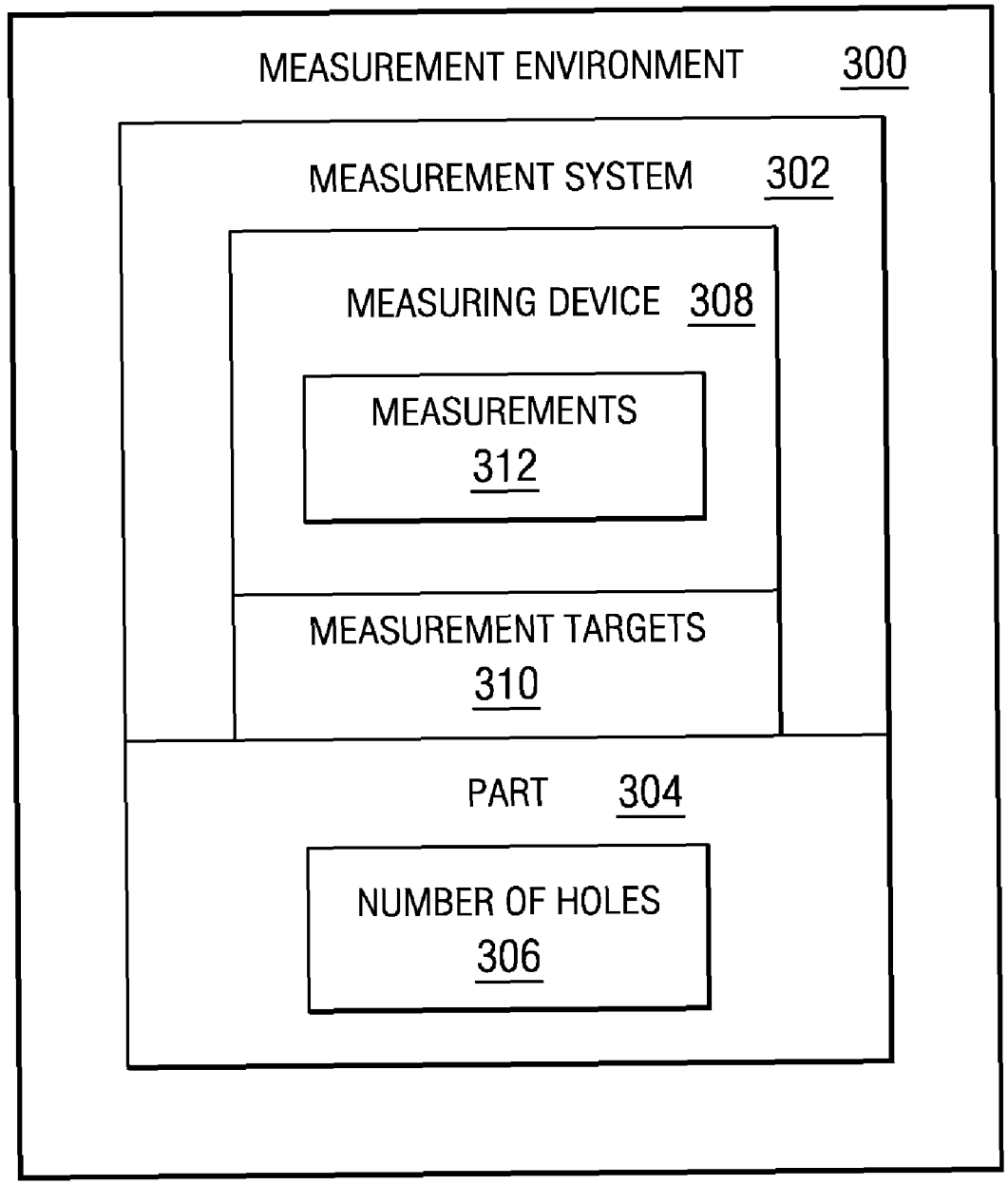
FIG. 3 is a diagram of a measurement environment in accordance with an advantageous embodiment.

With reference now to FIG. 3, a diagram of a measurement environment is depicted in accordance with an advantageous embodiment. Measurement environment 300 includes measurement system 302 and part 304. Measurement system 302 may make measurements of part 304. In this example, measurement system 302 may measure a number of holes 306 in part 304.

Measurement system 302 may include measuring device 308 and measurement targets 310. Measurement targets 310 may be placed into the number of holes 306. Measuring device 308 may measure measurement targets 310 to generate measurements 312 of the number of holes 306 through measurement targets 310 being placed into the number of holes 306. The number of holes 306 may be one or more holes in this example.

The number of holes 306 also may have a pattern. Measuring device 308 may take various forms. For example, without limitation, measuring device 308 may be a camera, a video camera, a light detection and ranging (LIDAR) unit, a physical imprinting unit with a conversion to a digital representation, or some other suitable measurement device.

With measurements 312, a new part may be fabricated for attachment to part 304 through the number of holes 306 with the appropriate hole pattern.

Figure 4:
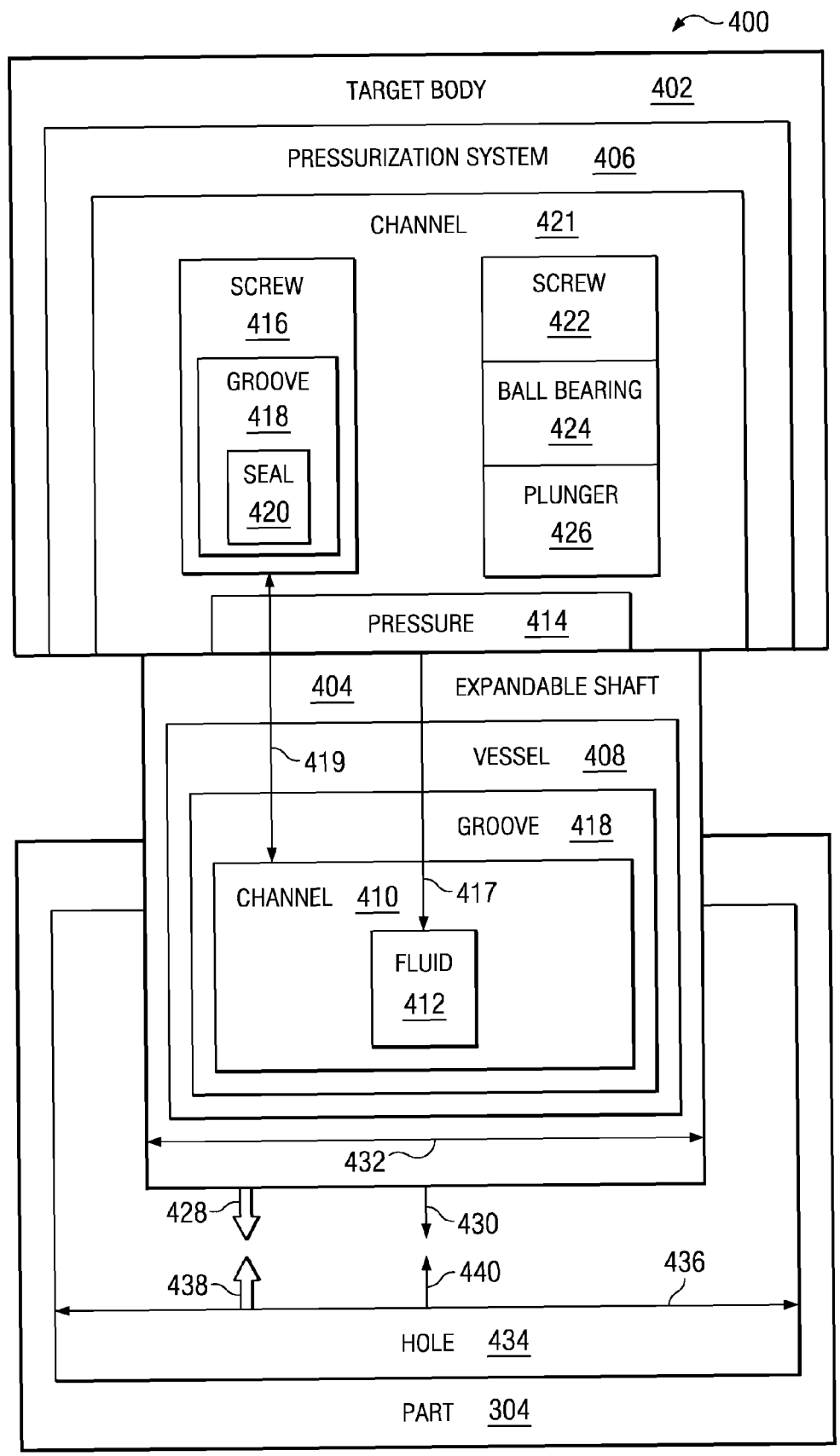
FIG. 4 is a diagram of a measurement target in accordance with an advantageous embodiment.

With reference now to FIG. 4, a diagram of a measurement target is depicted in accordance with an advantageous embodiment. Measurement target 400 is an example of a measurement target in measurement targets 310 in FIG. 3. As illustrated, measurement target 400 may have target body 402 and expandable shaft 404. Target body 402 may be an object and/or device that may be used to obtain measurements of an associate feature such as, for example, without limitation, a hole.

Target body 402 may be formed using any type of target body. For example, without limitation, target body 402 may be a photogrammetry spot, a theodolite target, a construction ball, a touch probe target, a coordinating measurement machine probe target, a laser tracker target, a laser projector target, a photogrammetry target, and/or some other suitable type of target body.

Expandable shaft 404 may include vessel 408, which may have channel 410. Fluid 412 may be located within channel 410. Vessel 408 for expandable shaft 404 may be constructed from various materials that may be capable of allowing vessel 408 to expand when placing fluid 412 under pressure with pressurization system 406. Vessel 408 may be constructed from, for example, without limitation, steel, aluminum, elastomeric plastic, an elastomeric reinforced plastic, an elastomeric unreinforced plastic, a composite material, and/or some other suitable material. The type of material selected will vary depending on the particular type of implementation in the selection of fluid 412.

Fluid 412 may be selected from any fluid that may be placed under pressure to cause vessel 408 to expand. Fluid 412 may be a fluid that may be capable of being pressurized within channel 410 to cause vessel 408 to expand. Fluid 412 may be, for example, without limitation, a fluid that does not compress before vessel 408 expands when fluid 412 may be under pressure 414 as generated by pressurization system 406. Fluid 412 may be, for example, without limitation, a hydraulic fluid, a brake fluid, a non-corrosive fluid, water, or some other suitable fluid. In other advantageous embodiments, a gas may be used in place of fluid 412, depending on the composition of vessel 408.

Pressurization system 406 may take various forms. Pressurization system 406 may be any number of components used to generate pressure 414 onto fluid 412. For example, without limitation, pressurization system 406 may include screw 416 having groove 418. Seal 420 may be located around groove 418. Screw 416 may be manipulated to move in to and out of channel 410 in the direction of arrow 419 in a manner to change pressure 414 on fluid 412 within channel 410, as shown by arrow 417. Seal 420 may prevent fluid 412 from escaping channel 410. These components may be located in channel 421, which may be in communication with channel 410 in vessel 408.

In other advantageous embodiments, pressurization system 406 may include screw 422, ball bearing 424, and plunger 426. Screw 422 may move to bias ball bearing 424 in channel 421 to move plunger 426, relative to channel 410, in a manner that generates pressure 414 on fluid 412.

Expandable shaft 404 may have axis 428, which may be a centerline for expandable shaft 404. In this example, expandable shaft 404 may take the form of a cylinder with axis 428. Axis 428 may be centerline 430 for expandable shaft 404. When axis 428 takes the form of centerline 430, axis 428 may be located centrally within diameter 432 of expandable shaft 404.

Expandable shaft 404 may be placed into hole 434 of part 304 from FIG. 3. Hole 434 may be an example of a hole within the number of holes 306 for part 304 in FIG. 3. Hole 434 may have diameter 436, which may be larger than diameter 432. Further, hole 434 may have axis 438, which may be centerline 440 for hole 434. When diameter 436 is greater than diameter 432, placement of expandable shaft 404 may result in axis 428 being out of alignment with axis 438.

With the different advantageous embodiments, pressurization system 406 may be activated to generate pressure 414 to cause a pressure on fluid 412 in a manner that causes expandable shaft 404 to expand diameter 432. The expansion of diameter 432 may maintain centerline 430. In other words, the expansion of vessel 408 may be such that axis 428 and/or centerline 430 remain substantially aligned.

This type of expansion of expandable shaft 404 within hole 434 may be such that centerline 430 may be substantially aligned with centerline 440.

In this manner, measurements of target body 402 may be used to measure centerline 440. In other words, a location and orientation of centerline 440, as well as other suitable parameters, may be measured and/or calculated for hole 434.

The illustrations of measurement environment 300 in FIG. 3 and measurement target 400 in FIG. 4 are not meant to imply physical or architectural limitations to the manner in which different measurement environments and measurement targets may be implemented. In other advantageous embodiments, other components may be used in addition to, or in place of, the ones illustrated.

For example, without limitation, in some advantageous embodiments, measurement targets 310 in FIG. 3 may be homogeneous, while in other advantageous embodiments, measurement targets 310 in FIG. 3 may be heterogeneous. In some advantageous embodiments, target body 402 may have more than one target. For example, without limitation, target body 402 may have multiple photogrammetry targets rather than a single one. Also, different types of targets may be on and/or make up target body 402.

Heterogeneous targets may be used to generate different types of measurements. Further, measurement target 400 in FIG. 4 may include more than one target body depending on the particular implementation. Further, in some advantageous embodiments, expandable shaft 404 in FIG. 4 may have other shapes other than a cylindrical shape.

Figure 5:
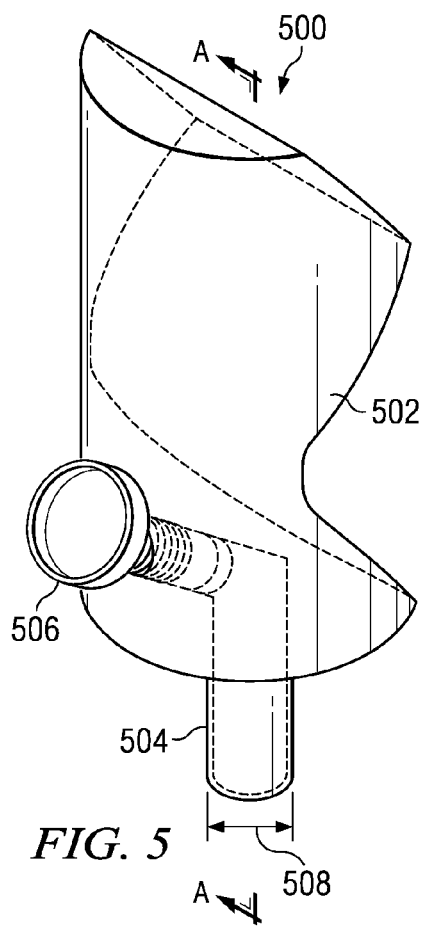
FIG. 5 is a diagram of a measurement target in accordance with an advantageous embodiment.

With reference now to FIG. 5, a diagram of a measurement target is depicted in accordance with an advantageous embodiment. In this example, measurement target 500 is shown in a perspective view. Measurement target 500 may include target body 502 and expandable shaft 504. Screw 506 may be seen in this view and may be used to generate pressure to cause expandable shaft 504 to expand beyond diameter 508.

Figure 6:
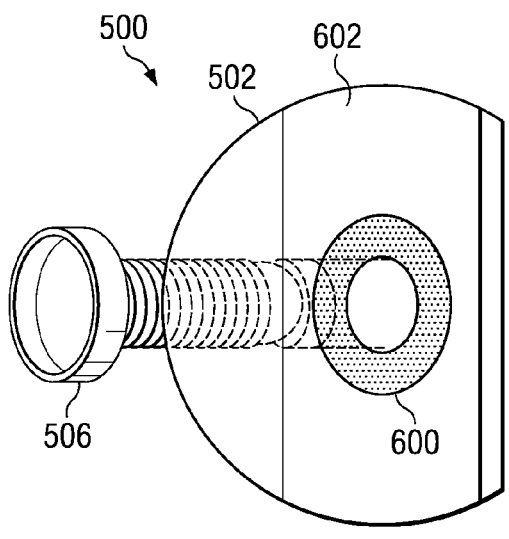
FIG. 6 is a top view of a measurement target in accordance with an advantageous embodiment.

With reference now to FIG. 6, a top view of measurement target 500 is depicted in accordance with an advantageous embodiment. In this illustrative example, the top view of measurement target 500 may be taken as a top to bottom view taken from lines A-A in FIG. 5. In this example, target 600 may be seen on top side 602 of target body 502. Target 600 may be a spot, for example, that may be measured and/or detected by a measurement device.

Figure 7:
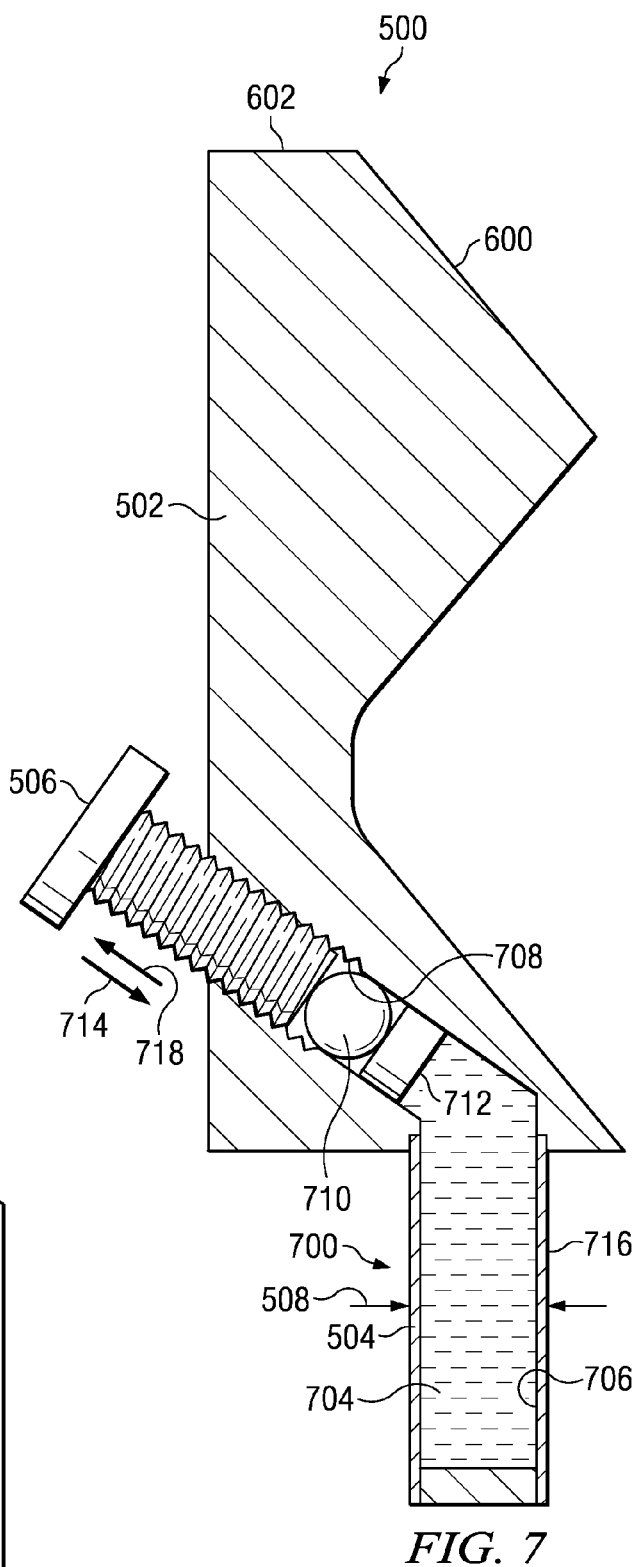
FIG. 7 is a cross-sectional side view of a measurement target in accordance with an advantageous embodiment.

With reference now to FIG. 7, a cross-sectional side view of measurement target 500 is depicted in accordance with an advantageous embodiment. In this view, vessel 700 has fluid 704 within channel 706 for expandable shaft 504. In this example, screw 506 extends into channel 708, which also may contain ball bearing 710 and plunger 712. In this depicted example, fluid 704 also may extend into channel 708 up to plunger 712.

Manipulation of screw 506 may move screw 506 in the direction of arrow 714 into channel 708. This movement of screw 506 may move ball bearing 710 and plunger 712 in the direction of arrow 714 to pressurize fluid 704. This pressurization of fluid 704 may cause side 716 of vessel 700 to expand, increasing diameter 508. The expansion of side 716 may be performed when expandable shaft 504 may be placed into hole 434 in FIG. 4. Movement of screw 506 in the direction of arrow 718 may reduce pressure applied to fluid 704. This reduction in pressure may cause side 716 of vessel 700 to move inward. The decrease in diameter 508 may be performed when removing measurement target 500 from a hole, not shown.

Figure 8:
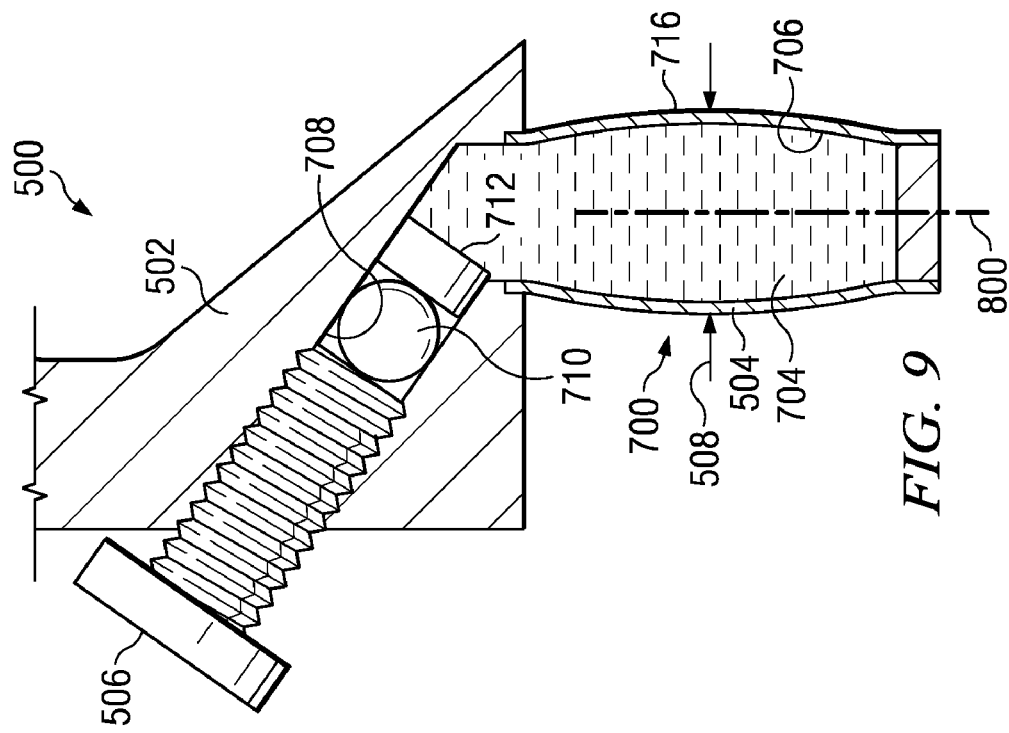
FIG. 8 is a diagram illustrating an expandable shaft in accordance with an advantageous embodiment.

With reference now to FIG. 8, a diagram illustrating an expandable shaft is depicted in accordance with an advantageous embodiment. As can be seen in this example, expandable shaft 504 has centerline 800.

Figure 9:
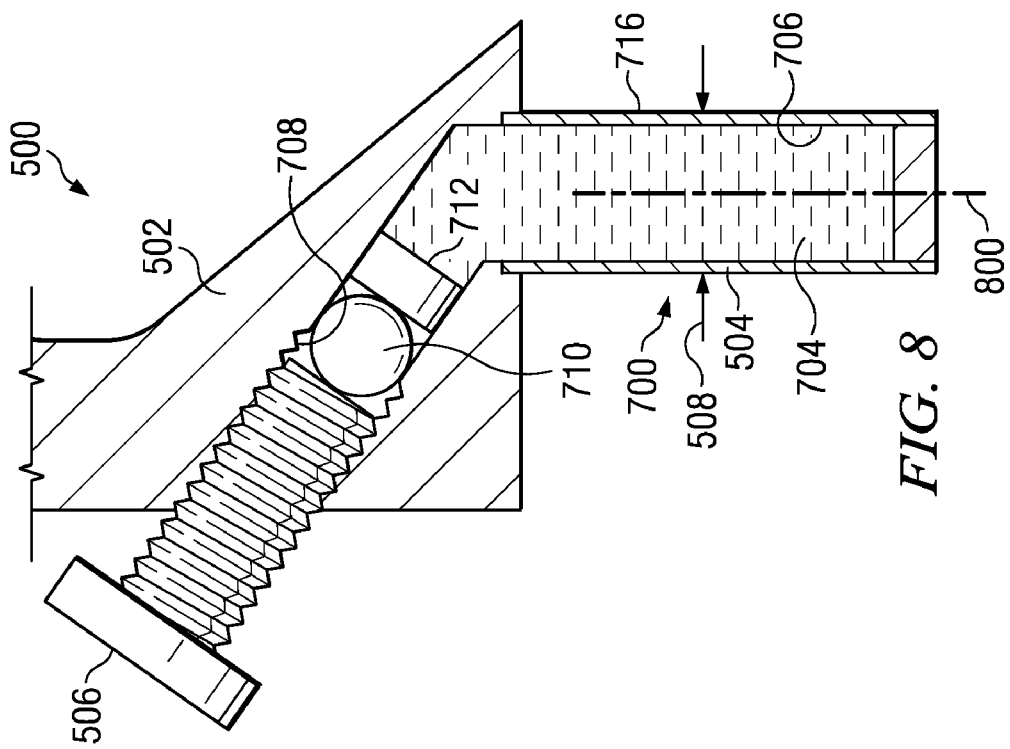
FIG. 9 is a diagram of an expandable shaft in accordance with an advantageous embodiment.

FIG. 9 is a diagram of an expandable shaft in accordance with an advantageous embodiment. Expansion of expandable shaft 504 as illustrated in FIG. 9 may cause diameter 508 to expand around side 716. This expansion occurs around centerline 800. The expansion may be substantially concentric to centerline 800. As a result, centerline 800 may remain substantially aligned and/or coincide with centerline 440 when expandable shaft 504 is placed into hole 434. This type expansion may allow expandable shaft 504 to be self centering.

The illustration of measurement target 500 in FIGS. 5-9 have been provided for purposes of illustrating one manner in which a measurement target may be implemented and not meant to imply physical or architectural limitations to other advantageous embodiments. For example, without limitation, in other advantageous embodiments, target body 502 may have other shapes or numbers of targets in addition to target 600 on target body 500 in FIG. 6.

For example, without limitation, instead of providing target 600 in the form of a spot for photogrammetry, target 600 may be a theodolite target. In yet other advantageous embodiments, target body 502 may be a construction ball, a probe target, a laser tracker target, or some other suitable type of target body.

Figure 10:
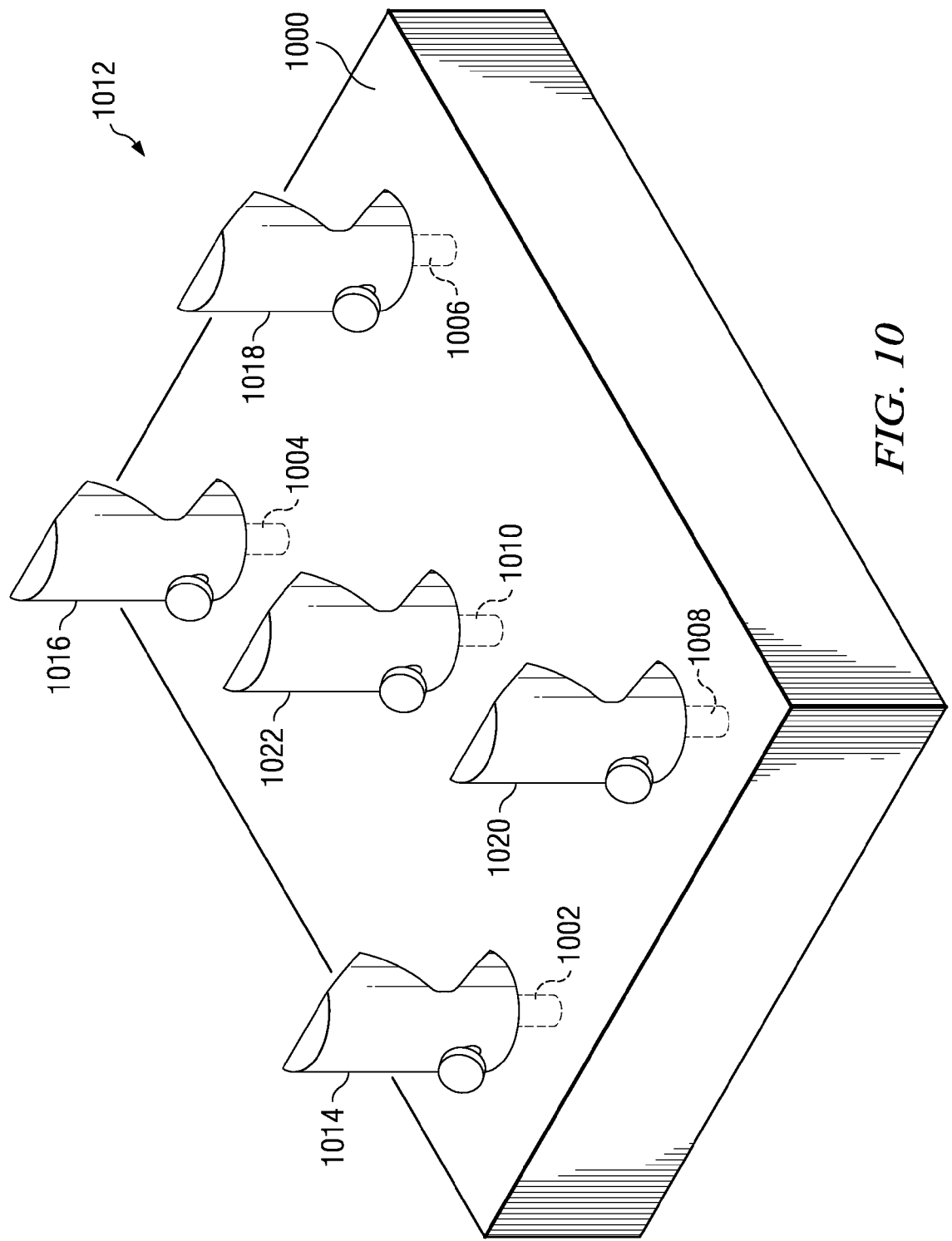
FIG. 10 is a diagram of a trimetric view of a part with target bodies in holes in accordance with an advantageous embodiment.

With reference now to FIG. 10, a diagram of a trimetric view of a part with target bodies in holes is depicted in accordance with an advantageous embodiment. In this example, part 1000 may be a trimetric view of part 304 in FIG. 3. As can be seen in this illustrative example, part 1000 may have holes 1002, 1004, 1006, 1008, and 1010 as shown in phantom. These holes have pattern 1012 and may be an example of the number of holes 306 in FIG. 3.

As illustrated, measurement targets 1014, 1016, 1018, 1020, and 1022 may be installed in holes 1002, 1004, 1006, 1008, and 1010, respectively. In this planned view, pattern measurement of pattern 1012 may be performed using measurement targets 1014, 1016, 1018, 1020, and 1022.

Figure 11:
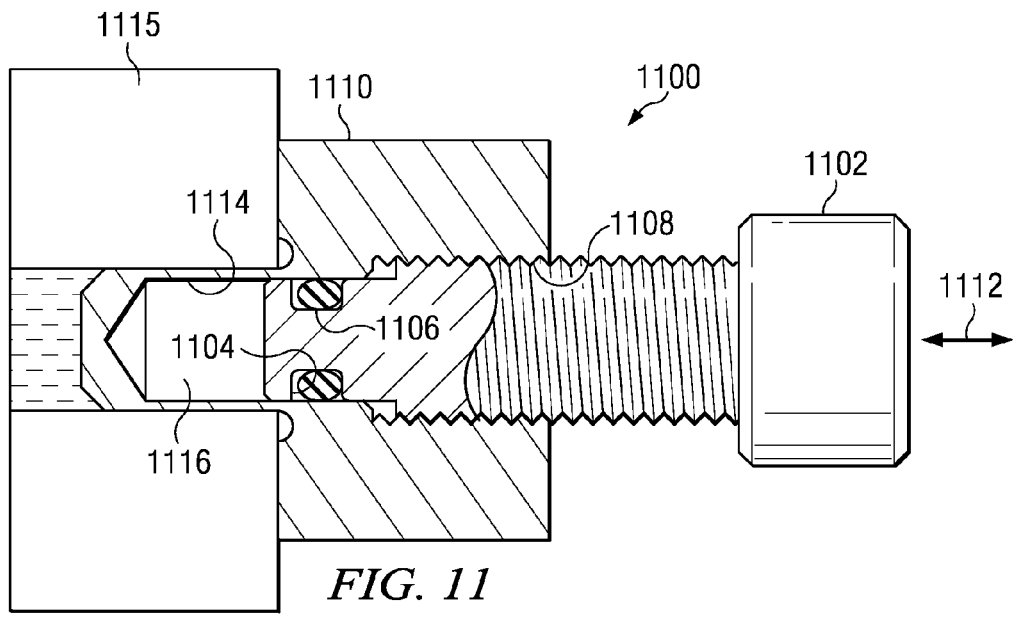
FIG. 11 is a diagram of a section cut illustrating components for a pressurization system in accordance with an advantageous embodiment.

With reference now to FIG. 11, a diagram of a section illustrating components for a pressurization system is depicted in accordance with an advantageous embodiment. In this illustrative example, pressurization system 1100 may include screw 1102, which has groove 1104. Seal 1106 may be placed into groove 1104. In this example, seal 1106 may be, for example, without limitation, an "O" ring.

Screw 1102 may be placed into channel 1108 within target body 1110, which is shown in a partial view in this example. Screw 1102 may be moved in the direction of arrows 1112 to move within channel 1114. Channel 1114 may be a channel within an expandable shaft 1115. Movement of screw 1102 may generate pressure on fluid 1116 within channel 1114.

In these illustrative examples, screw 1102 may be turned manually and/or automatically. This type of manipulation also may be performed for screw 506 in the illustration in FIGS. 5-9.

Figure 12:
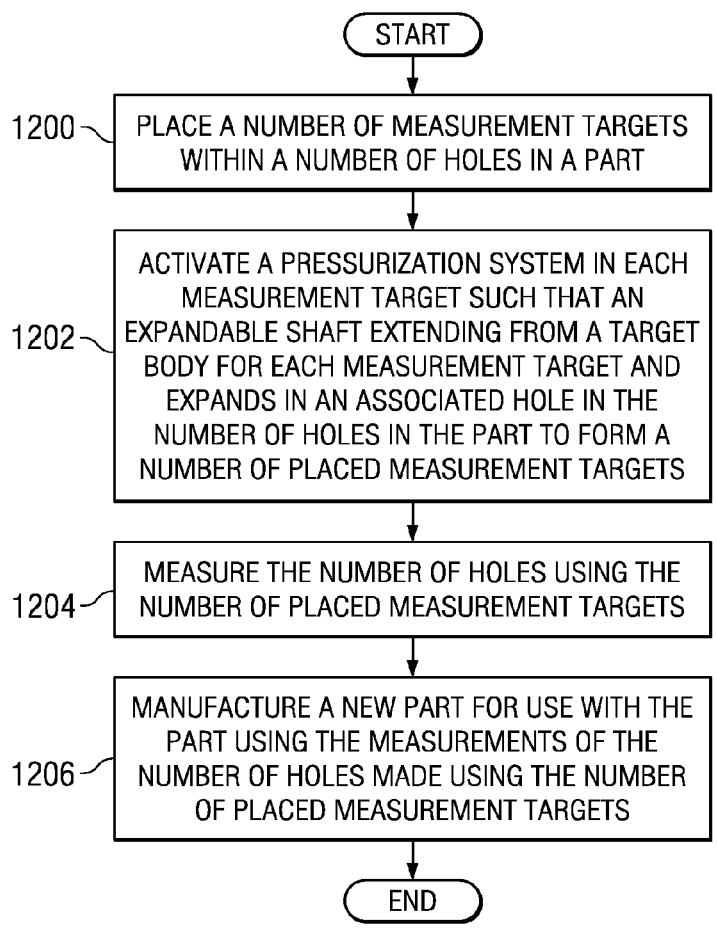
FIG. 12 is a flowchart of a process for processing a part in accordance with an advantageous embodiment.

With reference now to FIG. 12, a flowchart of a process for processing a part is depicted in accordance with an advantageous embodiment. The process illustrated in FIG. 12 may be implemented using a measurement environment such as, for example, without limitation, measurement environment 300 in FIG. 3.

The process begins by placing a number of measurement targets 310 within the number of holes 306 in part 304 (operation 1200). A number of items, in these examples, refers to one or more items. For example, without limitation, a number of measurement targets 310 may be one or more measurement targets. Pressurization system 406 may be activated in each measurement target 400 such that expandable shaft 404 extending from target body 402 for each measurement target 400 and expands in an associated hole in the number of holes 306 in part 304 to form a number of placed measurement targets (operation 1202). In the different advantageous embodiments, measurement targets 310 may be self-centering and may not require user action to ensure proper alignment.

The number of holes 306 is measured using the number of placed measurement targets (operation 1204). A new part for use with part 304 using measurements 312 of the number of holes 306 made using the number of placed measurement targets may be manufactured from measurements 312 (operation 1206), with the process terminating thereafter.

The illustration of the process in FIG. 12 is not meant to limit the manner in which measurement environment 300 in FIG. 3 may be implemented. In other advantageous embodiments, some operations may be omitted and other operations may be included, which are not shown. For example, depending on the particular implementation, operation 1206 may be omitted. In yet other advantageous embodiments, a measurement target may be placed in a hole with the pressurization mechanism being activated before another measurement target may be placed in another hole.

Thus, the different advantageous embodiments provide a method and apparatus for measuring features on a part. The different advantageous embodiments provide a target body and an expandable shaft extending from the target body. The expandable shaft may expand in a manner such that an axis for the expandable shaft may remain substantially aligned with an axis for a hole in which the expandable shaft may be placed.

The different advantageous embodiments may reduce the need for having different numbers of measurement targets with different shaft sizes. Although, depending on the particular holes, target bodies with different sized expandable shafts may be required. The expandability of these shafts, however, may reduce the number of measurement targets that may be needed.

Further, with the capability of expanding the diameter around the centerline or axis of the expandable shaft, the centerline of the expandable shaft may remain in substantial alignment with respect to a centerline of the hole in which the expandable shaft may be placed. In this manner, more accurate measurements of patterns of holes may be made using the different advantageous embodiments. These accurate measurements may result in a capability to manufacture new parts for existing parts in a manner that the new parts may fit the old parts without requiring as much rework and/or modification. Further, the different advantageous embodiments may eliminate a need to use an existing hole pattern for match drilling.

The description of the different advantageous embodiments has been presented for purposes of illustration and description and is not intended to be exhaustive or limited to the embodiments in the form disclosed. Many modifications and variations will be apparent to those of ordinary skill in the art. Although the different advantageous embodiments have been described with respect to objects, such as aircraft, other advantageous embodiments may be applied to other types of objects.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object. As yet another non-limiting example, the different advantageous embodiments may be applied to tooling.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for measuring a part comprising:
   a target body, the target body comprising a channel;
   an expandable shaft extending from the target body, the expandable shaft expands along a diameter dimension of the shaft; the expandable shaft comprising a vessel with a channel and a fluid located within the channel in the vessel, the vessel configured to expand when the fluid is pressurized;
   a pressurization system that pressurizes the fluid within the channel so as to cause the vessel to expand, the pressurization system further comprising; and
      a plunger located in the channel, the plunger configured such that biasing the plunger pressurizes the fluid within the channel.

2. The apparatus of claim 1, wherein the expandable shaft has a centerline and pressurizing the fluid within the channel causes the vessel to expand around the centerline.

3. The apparatus of claim 1, wherein the vessel is comprised of a material selected from steel, aluminum, an elastomeric reinforced plastic, and an elastomeric unreinforced plastic.

4. The apparatus of claim 1, wherein the vessel has a substantially cylindrical portion capable of being received in a hole in a part.

5. The apparatus of claim 1, wherein the target body has a channel containing the pressurization system and wherein the pressurization system comprises:
   a screw having a groove around a portion of a surface of the screw; and
   a seal located within the groove, wherein manipulation of the screw is capable of pressurizing the fluid.

6. The apparatus of claim 1, wherein the fluid under pressure does not compress before the vessel expands.

7. The apparatus of claim 1, wherein the fluid is selected from one of a hydraulic fluid, a brake fluid, water, and a non-corrosive fluid.

8. The apparatus of claim 1, wherein the target body is selected from one of a photogrammetry target, a theodolite target, a construction ball, a touch probe target, a coordinating measurement machine probe target, a laser tracker target, and a laser projector target.

9. The apparatus of claim 1 further comprising:
   a part with a hole, wherein the vessel is located within the hole and wherein expansion of the vessel causes the expandable shaft to fit within the hole such that a centerline of the expandable shaft is substantially aligned with an axis within the hole.

10. The apparatus of claim 9, wherein the part is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

11. An apparatus for measuring a hole in a part, the hole characterized by a central axis, the apparatus having a pressurized and a nonpressurized configuration, the apparatus comprising:
   a body, the body comprising a channel;
   an expandable shaft extending from the body, the expandable shaft expands along a centerline of the shaft, the expandable shaft comprising a vessel with a channel and a fluid located within the channel in the vessel;
   the vessel fitting within the hole of the part in the nonpressurized configuration and the vessel expanding to contact the hole in the pressurized configuration;
   a pressurization system that pressurizes the fluid within the channel so as to cause the vessel to expand to the pressurized configuration, the pressurization system further comprising;
      a screw extending into the channel;
      a plunger located in the channel; and
      a ball bearing located in the channel between the screw and the plunger, the screw, plunger, and ball bearing configured such that manipulation of the screw biases the plunger so as to place the fluid under pressure; and
   the vessel in the pressurized configuration is expanded such that the centerline of the vessel is substantially aligned with the central axis of the hole.

12. The apparatus of claim 11, wherein the vessel is comprised of a material selected from steel, aluminum, an elastomeric reinforced plastic, and an elastomeric unreinforced plastic.

13. The apparatus of claim 11, wherein the vessel has a substantially cylindrical portion capable of being received in a hole in a part.

14. The apparatus of claim 11, wherein the body has a channel containing the pressurization system and wherein the pressurization system comprises:

a screw having a groove around a portion of a surface of the screw; and a seal located within the groove, wherein manipulation of the screw is capable of pressurizing the fluid.

15. The apparatus of claim 11, wherein the fluid under pressure does not compress before the vessel expands.

16. The apparatus of claim 11, wherein the fluid is selected from one of a hydraulic fluid, a brake fluid, water, and a non-corrosive fluid.

17. The apparatus of claim 11, wherein the body is selected from one of a photogrammetry target, a theodolite target, a construction ball, a touch probe target, a coordinating measurement machine probe target, a laser tracker target, and a laser projector target.

18. The apparatus of claim 11, wherein the part is included in an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

* * * * *